No. 827,862. PATENTED AUG. 7, 1906.
H. GERDES.
PROCESS OF PRODUCING GAS.
APPLICATION FILED JULY 31, 1905.
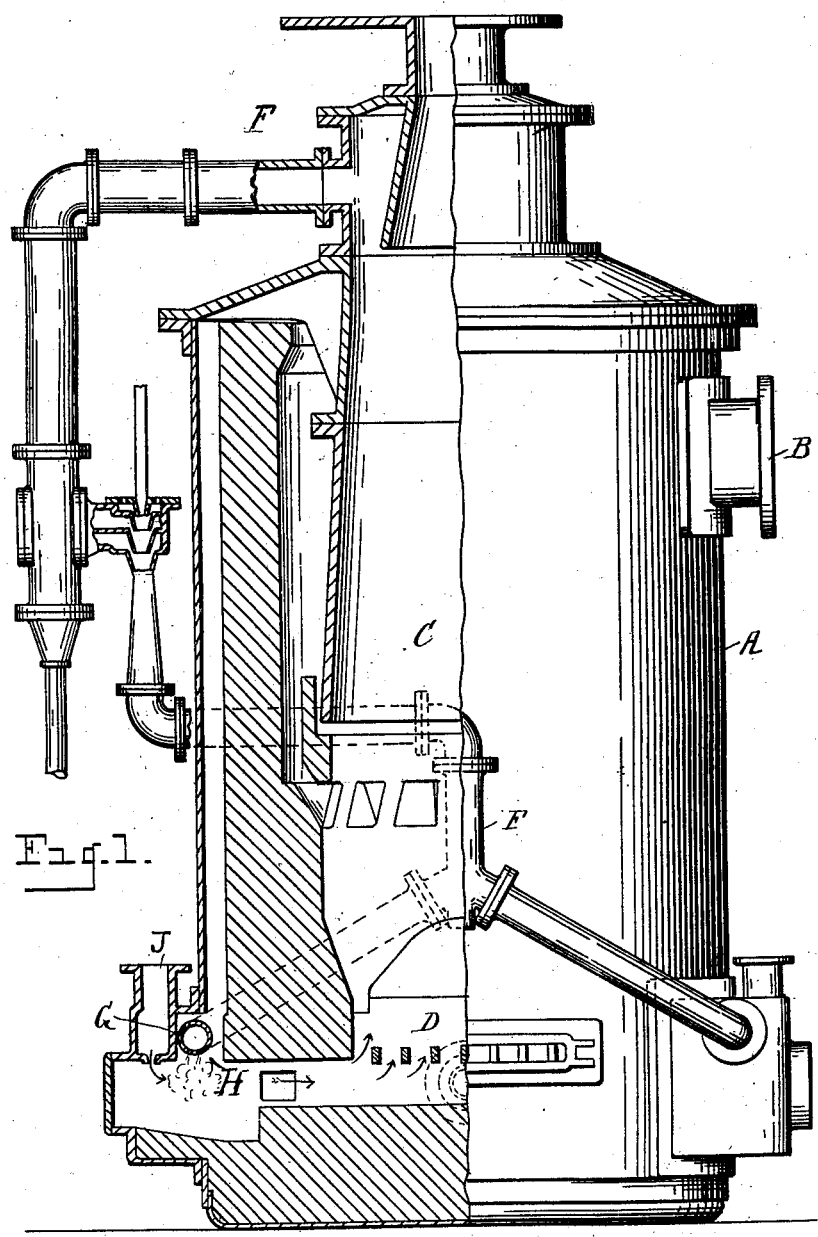
Witnesses.
Inventor.
Heinrich Gerdes
By James Whittemore
Atty

UNITED STATES PATENT OFFICE.

HEINRICH GERDES, OF BERLIN, GERMANY, ASSIGNOR TO AMERICAN SUCTION GAS PRODUCER COMPANY, OF LANSING, MICHIGAN, A CORPORATION OF MICHIGAN.

PROCESS OF PRODUCING GAS.

No. 827,862.      Specification of Letters Patent.      Patented Aug. 7, 1906.

Application filed July 31, 1905. Serial No. 272,057.

*To all whom it may concern:*

Be it known that I, HEINRICH GERDES, a subject of the German Emperor, residing at Berlin, in the Empire of Germany, have invented certain new and useful Improvements in Processes of Producing Gas, of which the following is a specification, reference being had therein to the accompanying drawings.

The invention relates to the manufacture of gas by what is commonly known as the "suction process," and in which mixed air and vapor is drawn through an incandescent mass of fuel.

More particularly the invention relates to that class of producers in which bituminous fuel or other fuel containing volatile combustible matter is employed.

Heretofore in the manufacture of gas by the above process from bituminous coals it has been customary to coke the coal within the producer, distilling off the gases therefrom and then redirecting these distilled gases into the lower end of the mass of burning coke. The object of this treatment is to burn all of the distilled gases, converting the same into carbon dioxid and vapor of water, and then to decompose these products, so as to form carbon monoxid and hydrogen. It has been found, however, in the practical operation of producers of this type that a considerable percentage of the distilled gases will pass through the incandescent fuel unconsumed and without decomposition, with the result that the final resulting gas is not of uniform quality and composition.

It is the object of the present process to avoid this objectionable result, and the invention broadly consists in a process in which the distilled gases are burned in an excess of oxygen and in advance of their passage through the incandescent fuel.

In the drawings, Figure 1 is a diagrammatic vertical section through the producer. Fig. 2 is a cross-section showing the inlet for the distilled gases.

A is the casing of a suction gas-producer of any suitable construction.

B is the gas-outlet conduit, and C the chamber containing the fuel, which is supported at its lower end upon the hearth. The upper portion of the chamber C forms a distillation-chamber in which the volatile combustible constituents of the fuel are distilled and escape through the conduit F, connected with said chamber.

To carry out my improved process, the conduit F is connected with one or more discharge-nozzles, such as G, which are arranged in a chamber H beneath the grate and at the point where it escapes to the air-current drawn in at J. As shown, these nozzles G are in the form of tubes extending transversely across the chamber H upon opposite sides of the fuel-chamber C and having downwardly-directed jet-apertures therein through which the gas is discharged and directed toward the hearth. Thus when the jets are ignited they will extend across the path of the incoming air, resulting in very free and complete combustion and the raising of the excess of air and vapor and the products of combustion to a high temperature before it reaches the incandescent fuel. The final result will be the complete transformation of all of the distilled gases into carbon monoxid and hydrogen.

For temporarily supporting the fuel when starting and in cleaning out the clinker a grate D may be used, which during regular operation is removed.

What I claim as my invention is—

1. The method of producing gas which consists in heating fuel to distil and separate therefrom the volatile combustible matter, burning said distilled and separated matter to produce practically complete oxidation thereof, and passing the products of combustion through an incandescent mass of fuel to decompose the same.

2. The method of producing gas which consists in heating a fuel to distil and separate therefrom the volatile combustible matter, burning said distilled and separated matter to produce substantially complete oxidation thereof, and in passing the products of combustion through an incandescent portion of the fuel from which the volatile matter has previously been expelled.

3. The method of producing gas which consists in heating the fuel to distil and separate therefrom the volatile combustible matter, burning said distilled and separated matter to produce substantially complete oxidation thereof, passing the products of combustion through an incandescent portion of the fuel from which the distilled matter has previously been expelled, and in drawing off the resulting gas substantially free from distilled matter.

4. The method of producing gas which consists in heating a fuel to distil and separate therefrom the volatile combustible matter, burning the distilled and separated matter in an excess of oxygen to produce substantially complete combustion, passing the products of combustion together with oxygen through an incandescent portion of the fuel from which the distilled matter has been previously expelled, and in drawing off the resulting gas substantially free from distilled matter.

In testimony whereof I affix my signature in presence of two witnesses.

HEINRICH GERDES.

Witnesses:
HENRY HASPER,
WOLDEMAR HAUPT.